United States Patent
Welker et al.

(10) Patent No.: US 9,366,774 B2
(45) Date of Patent: Jun. 14, 2016

(54) USING CAMERAS IN CONNECTION WITH A MARINE SEISMIC SURVEY

(75) Inventors: Kenneth E. Welker, Nesoya (NO); Ottar Kristiansen, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 1564 days.

(21) Appl. No.: 12/168,120

(22) Filed: Jul. 5, 2008

(65) Prior Publication Data

US 2010/0002076 A1 Jan. 7, 2010

(51) Int. Cl.
*G01V 1/38* (2006.01)
*H04N 13/02* (2006.01)

(52) U.S. Cl.
CPC .............. *G01V 1/38* (2013.01); *H04N 13/021* (2013.01); *H04N 13/0239* (2013.01)

(58) Field of Classification Search
USPC .......................................................... 348/81
See application file for complete search history.

(56) References Cited

U.S. PATENT DOCUMENTS

| | | | |
|---|---|---|---|
| 4,185,714 A * | 1/1980 | Pascouet | F15C 1/22 181/115 |
| 5,867,451 A | 2/1999 | Chang et al. | |
| 6,081,765 A * | 6/2000 | Ziolkowski | G01V 13/00 702/17 |
| 6,522,797 B1 | 2/2003 | Siems et al. | |
| 6,829,197 B2 * | 12/2004 | Erikson | G01S 15/003 348/81 |
| 2003/0056568 A1 * | 3/2003 | Kleinberg | G01V 9/007 73/19.01 |
| 2003/0058738 A1 * | 3/2003 | Erikson | G01S 15/025 367/7 |
| 2005/0105392 A1 * | 5/2005 | Martin | G01V 1/38 367/15 |
| 2005/0285941 A1 * | 12/2005 | Haigh | G08B 13/19602 348/155 |
| 2006/0092042 A1 * | 5/2006 | Davis | G01D 9/005 340/870.01 |
| 2006/0286931 A1 * | 12/2006 | Rhodes | H04B 13/02 455/40 |
| 2007/0263489 A1 * | 11/2007 | Vaage | G01V 1/137 367/144 |
| 2008/0008031 A1 * | 1/2008 | Vigen | G01V 1/3835 367/15 |
| 2008/0008038 A1 * | 1/2008 | Robertsson | G01V 1/3808 367/21 |
| 2008/0175102 A1 * | 7/2008 | Hegna | G01V 1/38 367/144 |
| 2009/0128800 A1 * | 5/2009 | Meldahl | G01V 1/3808 356/28.5 |

OTHER PUBLICATIONS

Day, et al, Air-Leak Detection Using Frequency Domain Deconvolution, EAGE, 2007.
Underwater Laser, Housed Lasers for Underwater Video Applications, http://www.cmapsystems.com/index.htm, 2008.
Underwater Light, Camera, & Laser, http://www.agoenvironmental.com/Leadframe.htm, 2008.
DRDC Valcartier Transfers Unique Underwater Camera to Industry, http://www.drdc-rddc.gc.ca/notices_e.asp, Last Updated: Oct. 3, 2005.
PCT Search Report, dated Jan. 26, 2010, Application No. PCT/US2009/049148.

* cited by examiner

*Primary Examiner* — Natisha Cox

(57) ABSTRACT

A technique includes obtaining data indicative of images of a marine seismic source event, which are acquired by underwater cameras and processing the data to determine an attribute (a seismic bubble volume or motion, as non-limiting examples) that is associated with the seismic source event.

22 Claims, 9 Drawing Sheets

USING CAMERAS IN CONNECTION WITH A MARINE SEISMIC SURVEY

BACKGROUND

The invention generally relates to using cameras in connection with a marine seismic survey.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes obtaining data indicative of images of a marine seismic source event, which are acquired by underwater cameras and processing the data to determine an attribute (a seismic bubble volume or motion, as non-limiting examples) that is associated with the seismic source event.

In another embodiment of the invention, a technique includes monitoring images that are acquired by underwater cameras in connection with a towed marine seismic survey to detect a problem with towed seismic equipment.

In another embodiment of the invention, a system includes towed seismic sources and underwater cameras that are mounted to the towed seismic sources. The towed seismic sources initiate a seismic source event, and the cameras are oriented to acquire data indicative of images of the seismic source event.

In another embodiment of the invention, a system includes an interface and a processor. The interface receives data indicative of photographic images of a seismic source event, and the processor processes the data to determine an attribute that is associated with the seismic source event.

In yet another embodiment of the invention, an article includes a computer readable storage medium containing instructions that when executed by a processor-based system cause the processor-based system to obtain data indicative of underwater photographic images of a seismic source event and process the data to determine an attribute that is associated with the seismic source event.

Advantages and other features of the invention will become apparent from the following drawing, description and claims.

DETAILED DESCRIPTION

Figure 1:
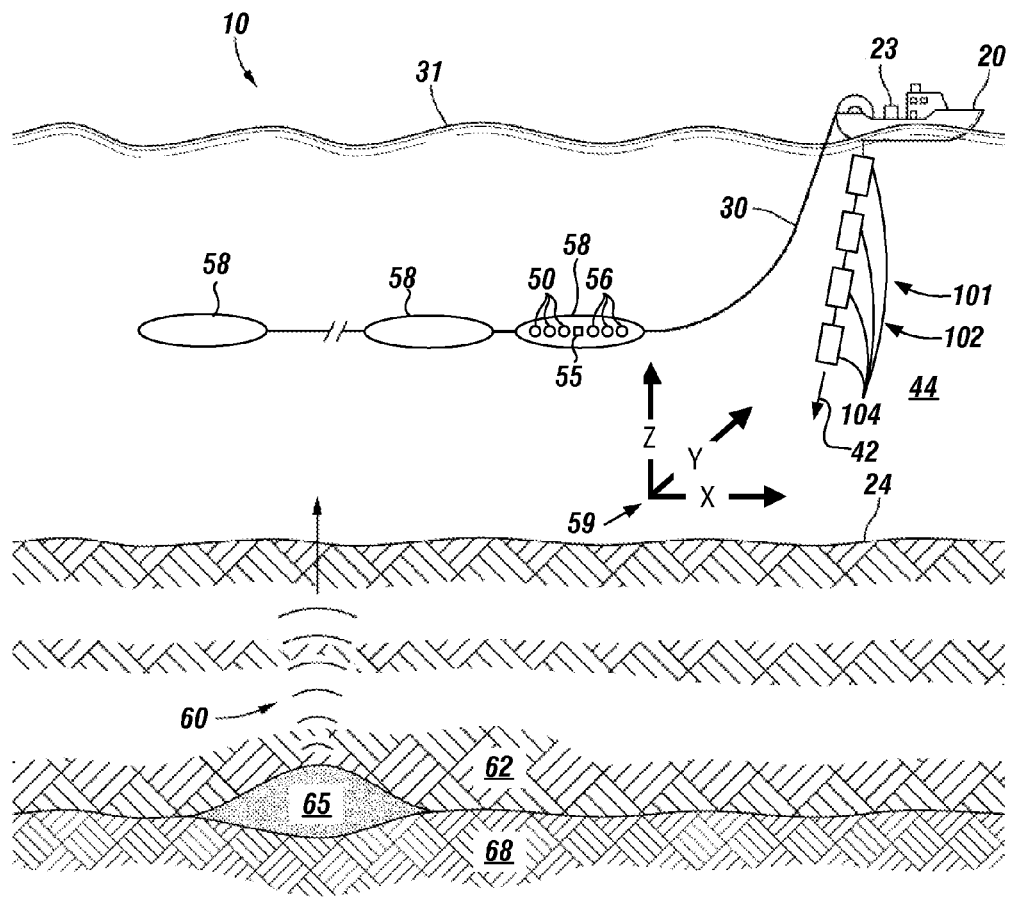
FIG. 1 is a schematic diagram of a marine acquisition system according to an embodiment of the invention.

FIG. 1 depicts an embodiment 10 of a marine seismic data acquisition system in accordance with some embodiments of the invention. In the system 10, a survey vessel 20 tows one or more seismic streamers 30 (one exemplary streamer 30 being depicted in FIG. 1) behind the vessel 20. The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors that record seismic signals.

In accordance with embodiments of the invention, the seismic sensors are multi-component seismic sensors 58, each of which is capable of detecting a pressure wavefield and at least one component of a particle motion that is associated with acoustic signals that are proximate to the multi-component seismic sensor 58. Examples of particle motions include one or more components of a particle displacement, one or more components (inline (x), crossline (y) and vertical (z) components (see axes 59, for example)) of a particle velocity and one or more components of particle acceleration.

Depending on the particular embodiment of the invention, the multi-component seismic sensor 58 may include one or more hydrophones, geophones, particle displacement sensors, particle velocity sensors, accelerometers, pressure gradient sensors, or combinations thereof.

For example, in accordance with some embodiments of the invention, a particular multi-component seismic sensor 58 may include a hydrophone 55 for measuring pressure and three orthogonally-aligned accelerometers 50 to measure three corresponding orthogonal components of particle velocity and/or acceleration near the seismic sensor 58. It is noted that the multi-component seismic sensor 58 may be implemented as a single device (as depicted in FIG. 1) or may be implemented as a plurality of devices, depending on the particular embodiment of the invention. A particular multi-component seismic sensor 58 may also include pressure gradient sensors 56, which constitute another type of particle motion sensors. Each pressure gradient sensor measures the change in the pressure wavefield at a particular point with respect to a particular direction. For example, one of the pressure gradient sensors 56 may acquire seismic data indicative of, at a particular point, the partial derivative of the pressure wavefield with respect to the crossline direction, and another one of the pressure gradient sensors may acquire, a particular point, seismic data indicative of the pressure data with respect to the inline direction.

The marine seismic data acquisition system 10 includes a seismic source that may be formed from one or more seismic source arrays 102 (one partial source array 102 being depicted in FIG. 1). Each source array 102, in turn, includes multiple strings 101 (one string 101 being depicted in FIG. 1) of source elements 104 (air guns, for example). As an example, the array 102 may be a 3-x-6 array of seismic source elements, although in other examples, arrays of other sizes may be used. In some embodiments of the invention, the seismic source elements 104 may be coupled to, or towed by, the survey vessel 20. Alternatively, in other embodiments of the invention, the seismic source elements 104 may operate independently of the survey vessel 20, in that the elements 104 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic source elements 104 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are acquired by the sources 40 produce corresponding reflected acoustic signals, or pressure waves 60, which are sensed by the multi-component seismic sensors 58. It is noted that the pressure waves that are received and sensed by the multi-component seismic sensors 58 include "up going" pressure waves that propagate to the sensors 58 without reflection, as well as "down going" pressure waves that are produced by reflections of the pressure waves 60 from an air-water boundary 31.

The multi-component seismic sensors 58 generate signals (digital signals, for example), called "traces," which indicate the acquired measurements of the pressure wavefield and particle motion. The traces are recorded and may be at least partially processed by a signal processing unit 23 that is deployed on the survey vessel 20, in accordance with some embodiments of the invention. For example, a particular multi-component seismic sensor 58 may provide a trace, which corresponds to a measure of a pressure wavefield by its hydrophone 55; and the sensor 58 may provide one or more traces that correspond to one or more components of particle motion, which are measured by its accelerometers 50.

Figure 11:
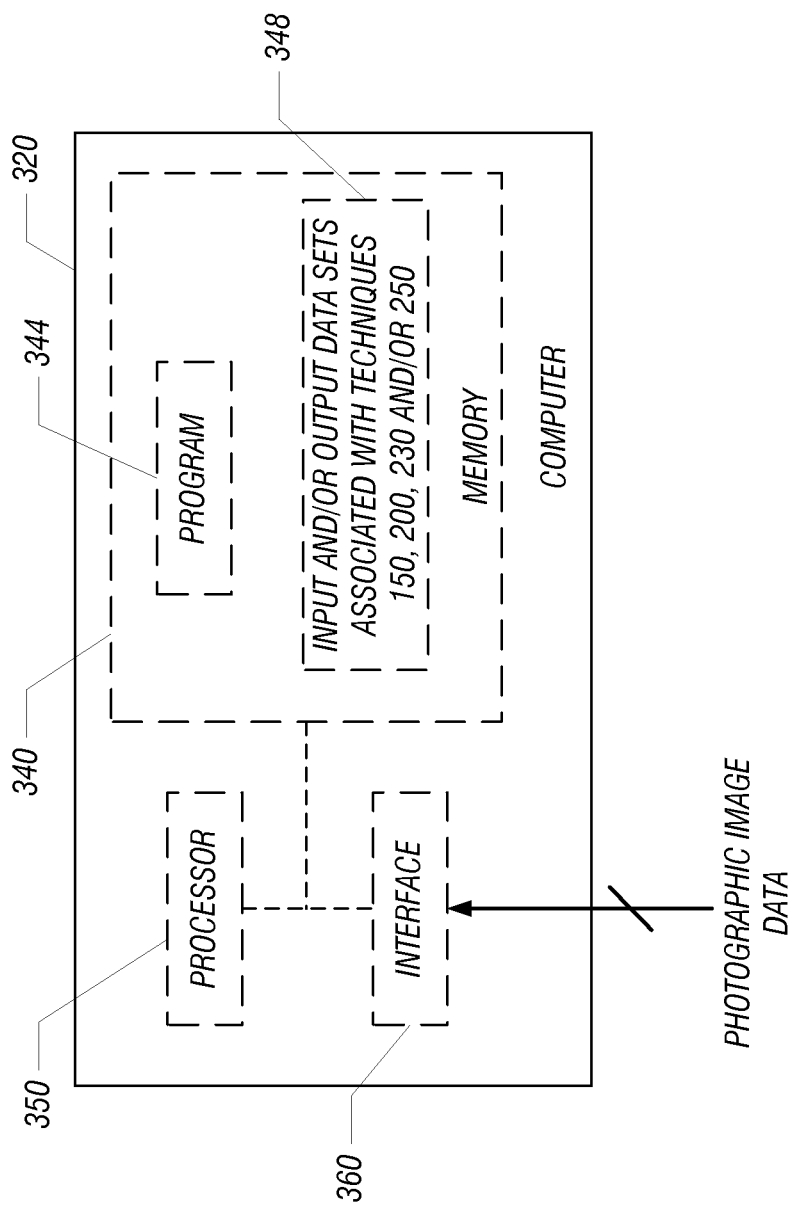
FIG. 11 is a schematic diagram of a data processing system according to an embodiment of the invention.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a seismic data processing system (such as an exemplary seismic data processing system 320 that is depicted in FIG. 11 and is further described below) that may be, for example, located on land or on the vessel 20. Thus, many variations are possible and are within the scope of the appended claims.

In accordance with embodiments of the invention, underwater cameras (digital cameras, for example) are used to acquire photographic images of seismic source events (e.g., seismic bubbles created by air guns) and underwater towed seismic equipment (the streamer spread, seismic source spread, air guns, fishing gear, buoys, etc., as just a few examples). As described further below, the acquired photographic images may be used for such purposes as determining attributes associated with seismic source events (such as the motion of a seismic bubble, volume of the seismic bubble, etc.) and detecting problems with the towed seismic equipment (such as detecting fish gear entanglements, air gun leakage, etc.).

Figure 2:
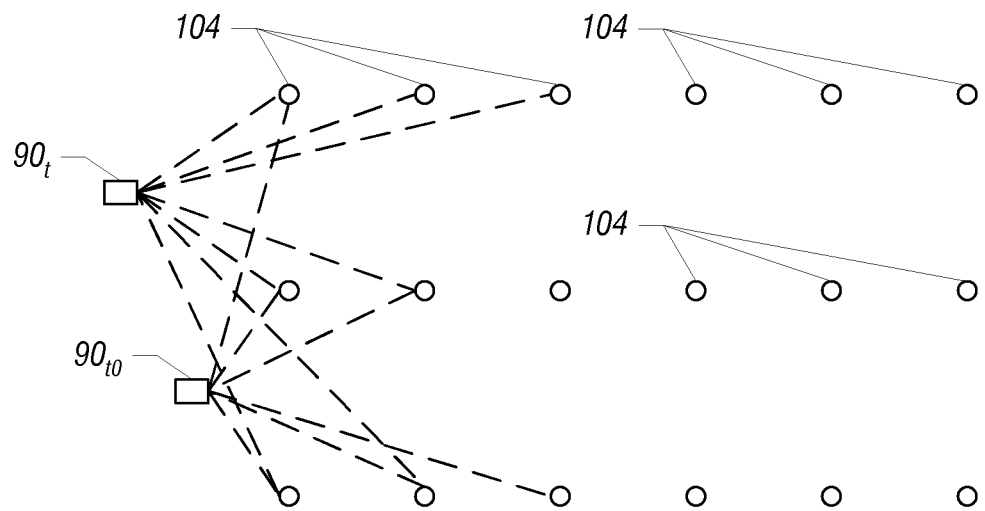
FIGS. 2, 3 and 4 are schematic diagrams of seismic source arrays according to embodiments of the invention.
Figure 3:
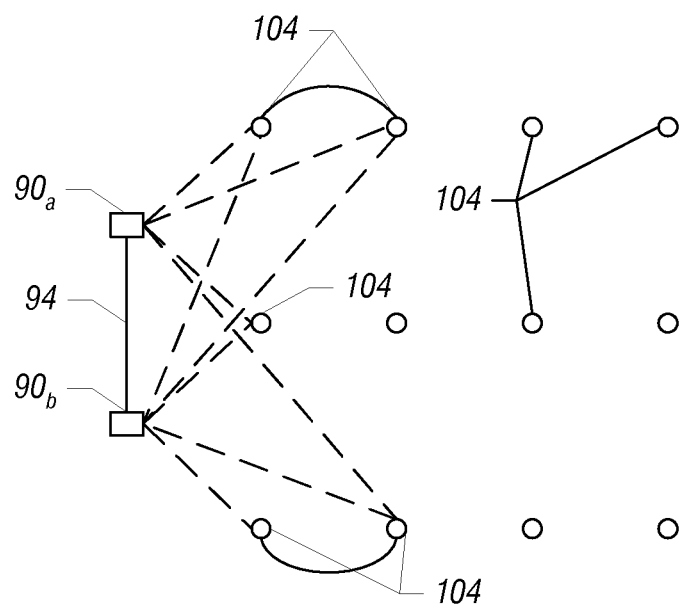

In accordance with embodiments of the invention, two or more digital stereo photographic cameras may be used to acquire stereo photographic images of the seismic source event and/or seismic equipment of interest. Using stereo images, it is possible, for example, to determine the overall shape and volume of the seismic source bubble. A "pseudo stereo" image may be generated using a single camera. As an example, FIG. 2 depicts the use of a single digital camera 90 to acquire photographic images in a space that includes a spread of seismic source elements 104. The incoming rays into the camera are depicted in FIG. 2 by dashed lines. The camera 90 is depicted in FIG. 2 in phantom at a first imaging time "t0," and again at a slightly later time "t" at 90*t*. Objects are in view of the camera lens are recorded photographically by the camera 90 at the two times t0 and t. If the time interval between image captures is sufficiently small, as compared to the accuracy of the method and the temporal geometry variation of the object being captured so that it does not significantly degrade the performance of the method, the two captured images may be considered to have been taken simultaneously, and any difference would likely be correctable by a suitable algorithm. Referring to FIG. 3, as another example, for purposes of acquiring an actual stereo photographic image, two cameras 90*a* and 90*b* that are connected by a platform, or an adjustable rigid member, represented by reference numeral "94," may be used.

As described below, the acquired photographic images may be used for purpose of determining the volume of a seismic bubble.

By measuring the seismic source bubble volume and coordinates of the center of the bubble, an additional estimate of the notional source will be available either alone or to be combined with the estimate based on near field hydrophone (NFH) estimates.

Further, an estimate of the source signature, which is independent of the estimate computed from the NFH estimates may be determined. More specifically, the monopole signature (called "S(t)" herein) is proportional to the second derivative of the bubble volume, as described below:

$$S(t) = \frac{\rho}{4\pi} \frac{\partial^2 V}{\partial t^2}, \qquad \text{Eq. 1}$$

where "ρ" represents the density of seawater and $$"\frac{\partial^2 V}{\partial t^2}"$$

represents the second derivative of the bubble volume with respect to time. The monopole signature S(t) could replace the need for NFH estimates, augment periods of missing NFH data, or be combined with NFH estimates of the source signature.

Although the cameras acquire images that depict the shape of the seismic bubble, the actual geometric dimensions are not known without a known baseline reference. As examples, the baseline reference may be derived from the distance between the focal points of cameras, the baseline reference may be derived based on a known distance between two objects that appear in images, or the baseline reference may be derived by two points on the platform or adjustable rigid member 94.

The quality of the acquired photographic images may be an issue for a successful process. In daylight conditions and clear water it may be possible to take the snapshots without adding any light. If there is sufficient light to obtain good contrast in the images nothing more is needed to complete the data acquisition. The contrast may be improved by applying artificial light in various forms, such by lights that are located near the cameras.

More details regarding the orientation and use of underwater cameras in connection with a towed marine seismic survey may be found in co-pending U.S. patent application Ser. No. 11/456,059, entitled "OPTICAL METHODS AND SYSTEMS IN MARINE SEISMIC SURVEYING," which was filed on Jul. 6, 2006, and is hereby incorporated by reference in its entirety.

Figure 4:
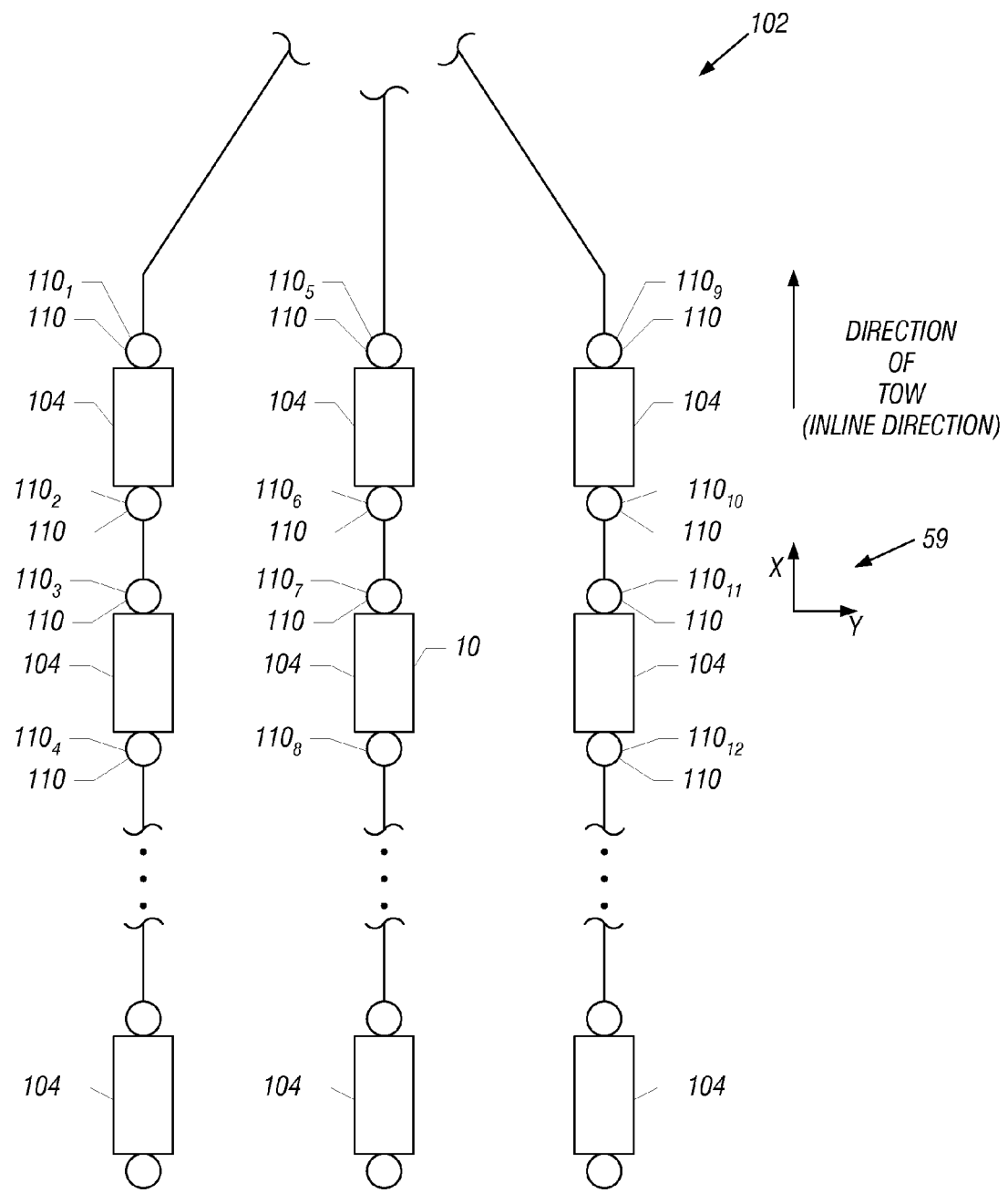

In accordance with some embodiments of the invention, the underwater cameras may be organized in an array of cameras that may be, in turn, may be integrated into the towed seismic equipment, such as the seismic source spread (as a non-limiting example). Referring to FIG. 4, more specifically, in accordance with embodiments of the invention, digital undersea cameras 110 (undersea cameras $110_1$, $110_2$, $110_3$, $110_4$, $110_5$, $110_6$, $110_7$, $110_8$, $110_9$, $110_{10}$, $110_{11}$, $110_{12}$, being depicted in FIG. 4 as examples) are mounted to an exemplary array 102 that is towed by the vessel 20 for purposes of acquiring photographic images of the seismic source bubble that is generated by the array 102, as well as images of the towed seismic equipment. As depicted in FIG. 4, in accordance with some embodiments of the invention, the digital cameras 110 may be arranged in groups, where the cameras 110 in each group are generally arranged in an equally-spaced grid pattern (assuming no distortion of the source array spread by currents, steering, etc.). The cameras 110 of each group are all oriented in the same direction. As an example, in accordance with some embodiments of the invention, certain digital cameras 110 of a particular group may be oriented to take pictures toward the seabed along the z, or vertical axis; and other digital cameras 110 of another group may be oriented to acquire digital images along the y, or crossline, direction.

As a more specific example, every other digital camera 110 along a particular source streamer may be oriented to acquire images in the vertical direction, and the remaining intervening cameras 110 may be oriented to acquire images in the crossline direction. Thus, the digital cameras $110_1$, $110_3$ $110_5$, $110_7$ $110_9$ and $110_{11}$ may have fields of view that each extend in the vertical direction; and digital cameras $110_2$, $110_4$, $110_6$, $110_8$, $110_{10}$ and $110_{12}$ may have fields of view that each extend in the crossline direction. The array 102 may have additional groups oriented in other directions (along the inline, or x axis direction, for example), in accordance with other embodiments of the invention.

Figure 5:
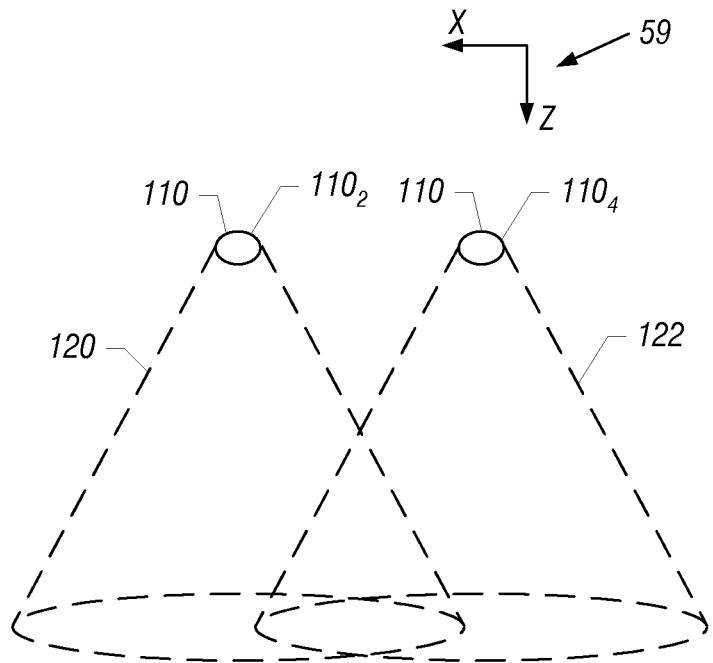
FIG. 5 is an illustration of overlapping field of views of cameras of the seismic source array in an inline direction according to an embodiment of the invention.
Figure 6:
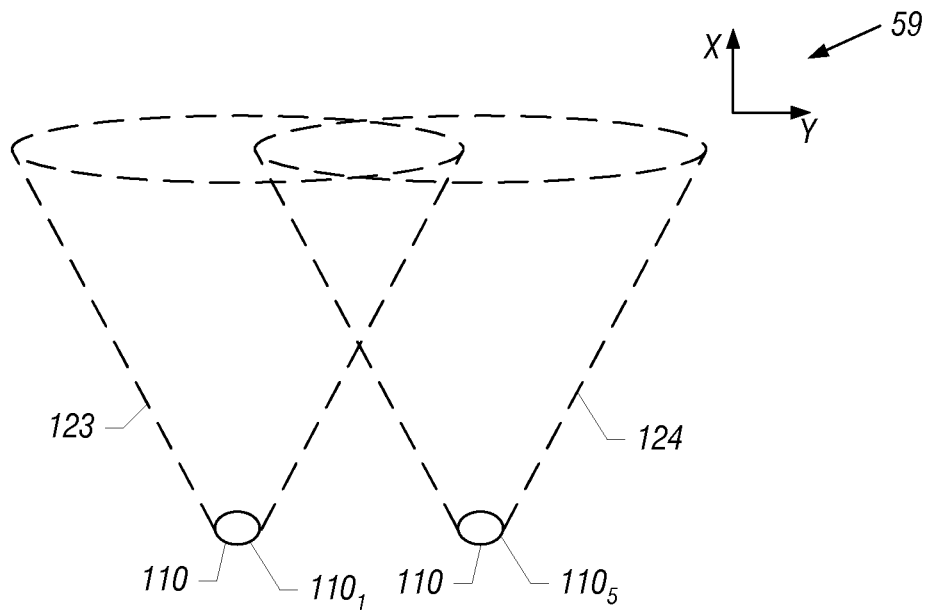
FIG. 6 is an illustration of overlapping field of views of cameras of the array in a crossline direction according to an embodiment of the invention.

In accordance with some embodiments of the invention, the digital cameras 110 are oriented so that the images that are acquired by adjacent cameras 110 in the same group overlap. For example, referring to FIG. 5 in conjunction with FIG. 4, the digital cameras $110_2$ and $110_4$ (i.e., adjacent crossline-oriented cameras) have overlapping fields of view 120 and 122. Similarly, vertically-oriented digital cameras $110_1$ and $110_5$ have overlapping fields of view 123 and 124, as depicted in FIG. 6.

For purposes of properly combining the photographic images that are acquired by the cameras together and determining the actual positions of objects (such as a seismic bubble) that are depicted in the acquired images, the positions of the cameras may be tracked. As an example, the camera positions may be co-located with the seismic source elements 104; and the positions of the cameras/seismic source elements 104 may be determined using acoustic and/or optical ranging techniques.

Figure 7:
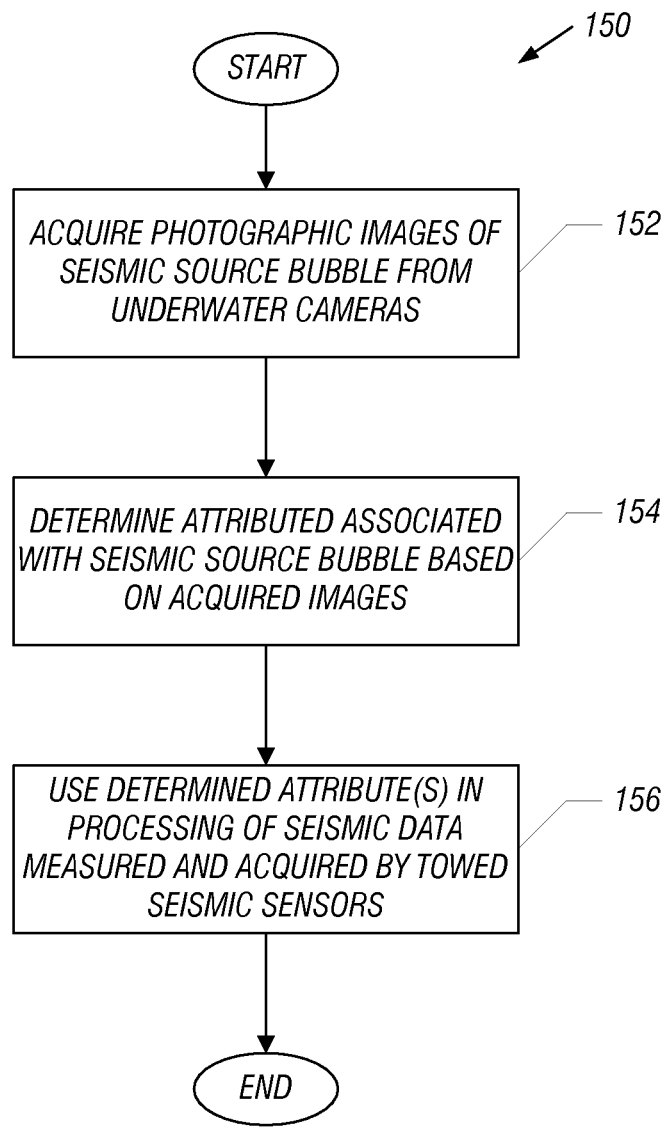
FIG. 7 is a flow diagram depicting a technique to use underwater cameras to monitor a seismic bubble according to an embodiment of the invention.

Referring to FIG. 7, in accordance with embodiments of the invention, a technique 150 includes acquiring (block 152) photographic images of a seismic source event, such as a seismic bubble, from underwater cameras. Based on these images, one or more attributes of the seismic bubble may be determined, pursuant to block 154. The attributes may then be used (block 156) in the processing of seismic data measurements that are acquired by the towed seismic sensors of the towed streamers.

In this regard, the cameras may be useful for determining the position, motion and/or volume of a source-generated seismic bubble. The motion of the bubble in the reference frame of the seismic source array may be determined with methods of photogrammetry; and the bubble volume may be determined at different times after the seismic event in order to more precisely recreate the near and far field source signatures.

Both measurements of volume and motion of the seismic bubble may be measured and recorded by using the cameras. Thus, the cameras may, for example, collectively acquire still frames of the seismic source bubble, and the acquisitions of the still frames are spaced apart at time intervals to create a moving record, or "video," of the bubble. Discrete pictures may be taken at any interval, including what would be considered a movie/video record interval. The bubble position may also be related to an absolute reference frame by measuring the offset from a source of a reference frame to GPS antennas. In this regard, the GPS antennas may be located on a source float, which is associated with the array 102.

Figure 8:
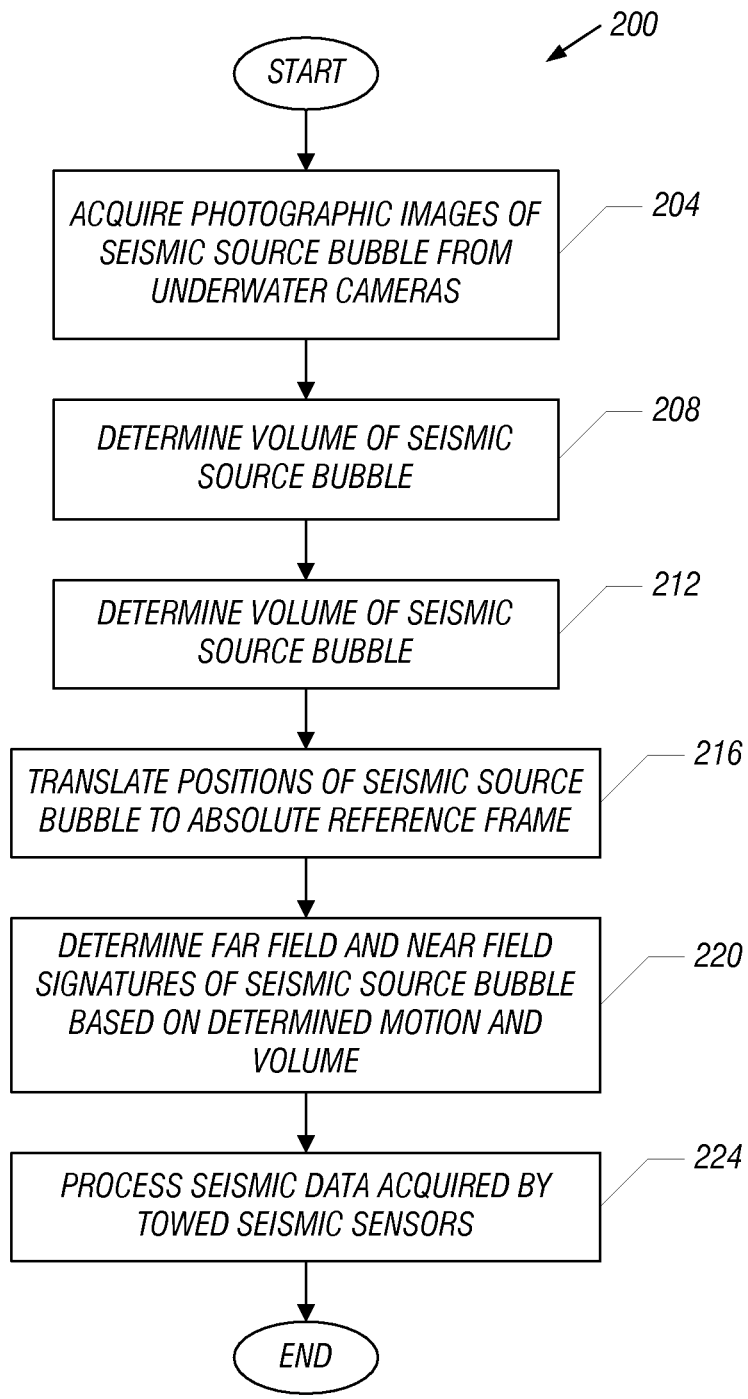
FIG. 8 is a flow diagram depicting a technique to measure motion and volume of a seismic bubble using images acquired by underwater cameras according to an embodiment of the invention.

Referring to FIG. 8 in conjunction with FIG. 4, in accordance with embodiments of the invention, a technique 200 includes acquiring photographic images of a seismic source event, such as a seismic source bubble, from underwater cameras, pursuant to block 204. The acquired images collectedly represent still frames of the seismic source bubble at different capture times. The volume (block 208), as well as the motion (block 210) of the seismic source bubble are determined based on the acquired photographic images. The positions of the seismic bubble may also be translated (block 216) to an absolute reference frame. Based on the determined motion and volume, the far field and near field signatures of the seismic bubble may also be determined, pursuant to block 220. Additionally, the seismic data that is acquired by the towed seismic sensors may be processed using the determined far field and near field signatures, according to block 224.

In addition to monitoring the seismic bubble, the underwater cameras may also be used for purposes of monitoring the towed seismic equipment. In this regard, without the cameras, there typically are two practical methods for inspecting insea seismic equipment, such as source arrays, streamers, lead-ins, surface floats and special connecting sections. These methods include using a work boat and a crew to bring the towed seismic equipment to the surface for inspection at the work boat or bringing the insea seismic equipment on board the survey vessel. Both of these techniques are relatively expensive and typically involve a considerable amount of physical risks to the personnel participating in the operation. Therefore, in accordance with embodiments of the invention described herein, the underwater cameras may be used for purposes of monitoring the towed seismic source equipment without bringing the towed seismic equipment to the surface.

There are many advantages to monitoring insea seismic equipment with the cameras. For example, the cameras may be used to monitor for tailbuoying tangle during turns, especially for an over/under arrangement of seismic streamers. The cameras may be used for purposes of monitoring the towed seismic equipment fishing gear entanglements. Additional cameras may be used for purposes of adjusting rope/chain length and other separation and layback sections during and after deployment. Additionally, the cameras may be used for purposes of source quality control, such as detecting misfires and detecting when guns do not otherwise properly fire.

Depending on the particular embodiment of the invention, the same set of camera or different sets of cameras may be used to acquire photographic images of the seismic event and photographic images of the towed seismic equipment. For embodiments of the invention in which a separate set of cameras is used to acquire photographic images of the towed seismic equipment, these cameras may not have overlapping fields of view.

Figure 9:
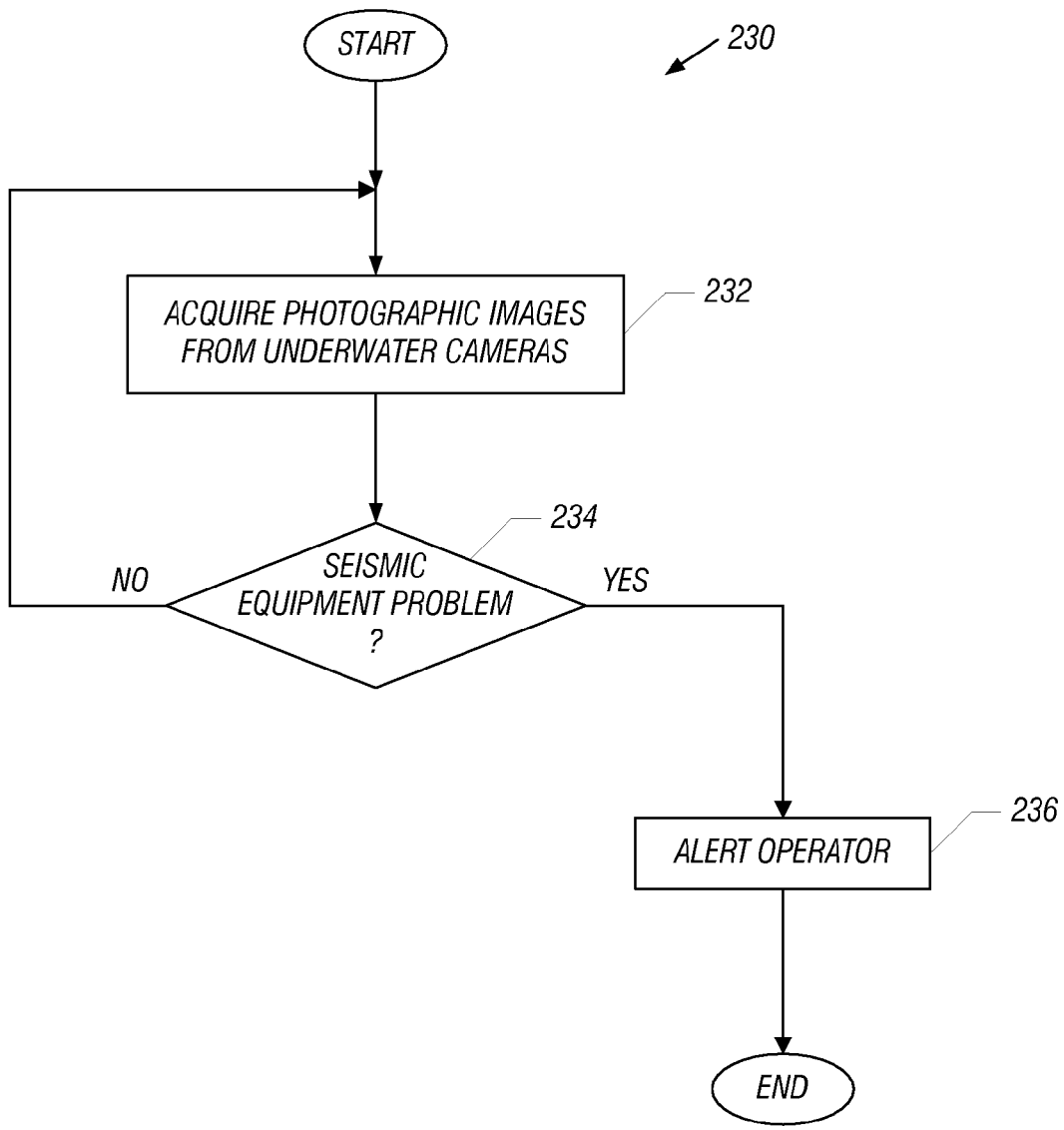
FIGS. 9 and 10 are flow diagrams depicting techniques to use images acquired by underwater cameras to detect problems with towed seismic equipment according to embodiments of the invention.

Referring to FIG. 9, a technique 230 may therefore be employed in accordance with some embodiments of the invention. Pursuant to the technique 230, photographic images from underwater cameras are acquired (block 232) and a determination is made (diamond 234) whether a problem has occurred with towed seismic equipment. If so, then the appropriate operator is alerted, pursuant to block 236. It is noted that the photographic images may be viewed/processed in real time or in a delayed fashion, depending on the particular embodiment of the invention.

In accordance with some embodiments of the invention, the images that are acquired by the cameras may be processed by computer-driven image processing pattern recognition routines to provide a fully automated surveillance system that creates an alert when a certain two dimensional 2-D, three-dimensional 3-D and/or even a 4-D (when time is considered) pattern occurs. For example, when a particular air gun has a significant air leak (due to the failure of a seal of the gun, for example), the resulting air leakage may cause a recognizable bubble image and/or bubble motion. Thus, by monitoring the photographic images of the seismic source event (in real time via a computer on the surface vessel 20, for example) and comparing the images to still and/or "video" images of events where gun air leakage has occurred, a computer may be able to automatically detect when air gun leakage has occurred and/or is occurring.

Figure 10:
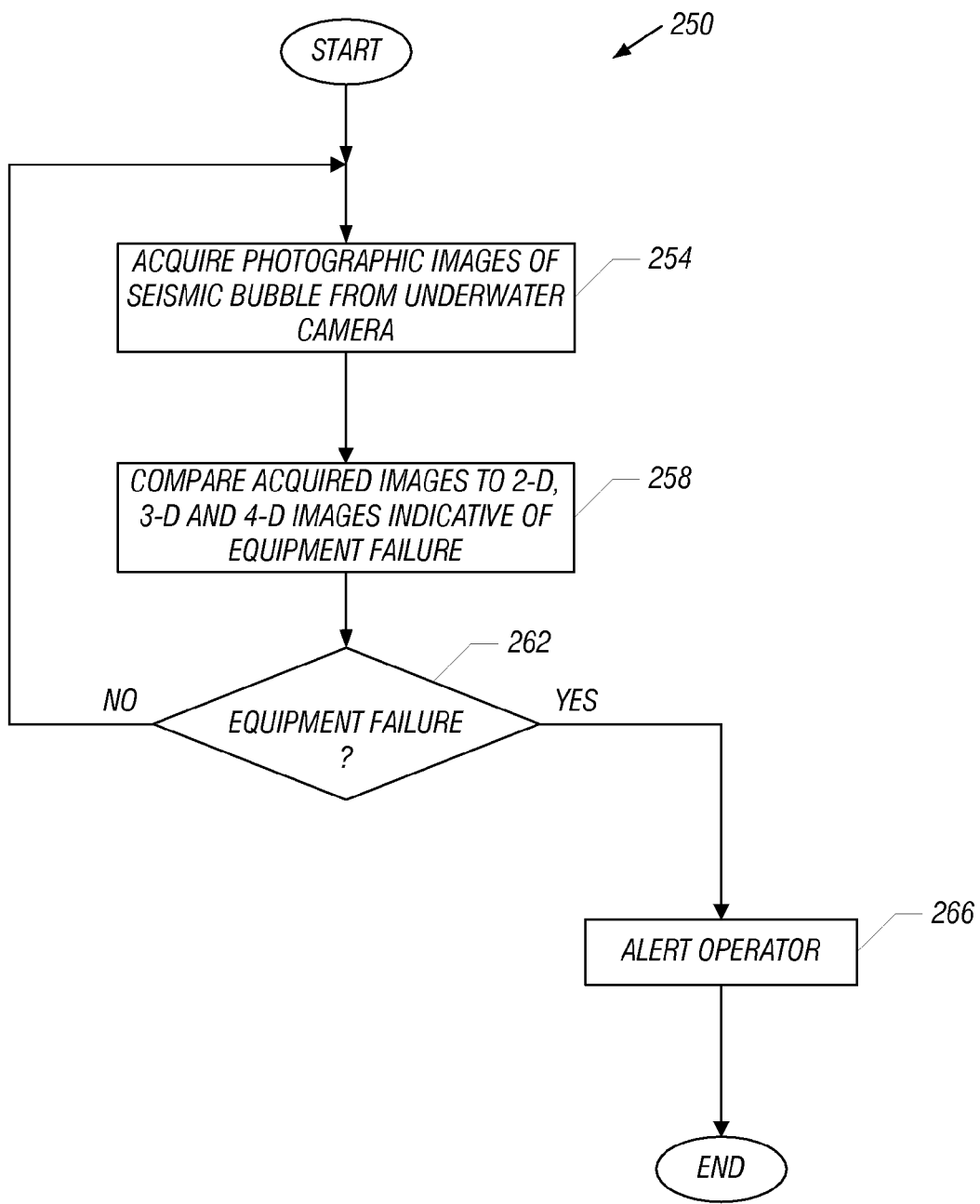

Thus, referring to FIG. 10, an embodiment of a technique 250 in accordance with the invention includes acquiring photographic images of a seismic bubble from underwater cameras, pursuant to block 254, and comparing (block 258) the acquired images to predetermined 2-D, 3-D and/or 4-D images, which are indicative of equipment failure. If any of the acquired images indicate gun failure (diamond 262), then an operator is alerted, pursuant to block 266.

Referring to FIG. 11, in accordance with some embodiments of the invention, a data processing system 320 may perform at least some of the techniques that are disclosed herein for such purposes as monitoring a seismic source event; determining the motion, volume and/or for near field signature of the event; monitoring towed seismic equipment; using acquired photographic images to automatically detect a failure in the towed seismic equipment; automatically alerting personnel to equipment failure, etc. The system 320 may be located on one of the streamers, on a source array, on the survey vessel, at a remote land-based facility, etc. In accordance with some embodiments of the invention, the system 320 may include a processor 350, such as one or more microprocessors and/or microcontrollers.

The processor 350 may be coupled to a communication interface 360 for purposes of receiving data that corresponds to the photographic image data. As examples, the interface 360 may be a USB serial bus interface, a network interface, a removable media (such as a flash card, CD-ROM, etc.) interface or a magnetic storage interface (IDE or SCSI interfaces, as examples). Thus, the interface 360 may take on numerous forms, depending on the particular embodiment of the invention.

In accordance with some embodiments of the invention, the interface 360 may be coupled to a memory 340 of the system 320 and may store, for example, various input and/or output data sets involved with the techniques 150, 200, 230 and/or 250, as indicated by reference numeral 348. The memory 340 may store program instructions 344, which when executed by the processor 350, may cause the processor 350 to perform one or more of the techniques that are disclosed herein, such as the techniques 150, 200, 230 and/or 250 and display results obtained via the technique(s) on a display (not shown in FIG. 9) of the system 320, in accordance with some embodiments of the invention.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   towing a seismic source, the seismic source comprising an air gun;
   towing at least one seismic streamer including seismic sensors;
   obtaining data indicative of at least one image of a marine seismic source event created by the air gun, the data being acquired by at least one underwater camera; and
   processing the data to determine an attribute associated with the seismic source event,
   wherein the seismic source event comprises an air bubble and the processing comprises determining an attribute of the seismic source event based at least in part on a volume of the air bubble.

2. The method of claim 1, wherein the act of processing the data comprises processing the data to determine a motion of the seismic source event.

3. The method of claim 1, wherein the act of processing the data comprises processing the data to determine a volume of the seismic source event.

4. The method of claim 1, further comprising:
   determining a signature of the seismic source event in response to the data.

5. The method of claim 1, wherein the act of processing the data comprises comparing the at least one image to at least one predetermined image pattern to detect failure of towed seismic equipment.

6. The method of claim 5, further comprising:
   automatically alerting an operator in response to the detection of the failure.

7. The method of claim 5, wherein the failure comprises air leakage from air guns.

8. A system comprising:
   at least one seismic source comprising an air gun to initiate a seismic source event in connection with a seismic survey in which the at least one seismic source is towed, the seismic source event comprising an air bubble; and
   at least one camera mounted to the at least one seismic source and oriented to acquire data indicative of at least one image of the air bubble to allow a volume of the air bubble to be determined.

9. The system of claim 8, wherein the at least one camera is adapted to acquire at least one image indicative of a volume or a motion of the seismic source event.

10. The system of claim 8, wherein the at least one camera is adapted to acquire overlapping images.

11. A system comprising:
    an interface to receive data indicative of at least one photographic image of a seismic source event created by an air gun during a seismic survey during which at least one seismic sensor and at least one air gun are towed and the at least one air gun creates the seismic source event; and
    a processor to process the data to determine an attribute associated with the seismic source event,
    wherein the seismic source event comprises an air bubble and the determination of the attribute comprises the processor determining a volume of the air bubble.

12. The system of claim 11, wherein the processor is adapted to process the data to determine a motion of the seismic source event.

13. The system of claim 11, wherein the processor is adapted to process the data to determine to determine a volume of the seismic source event.

14. The system of claim 11, further comprising:
    towed seismic equipment comprising seismic sources to generate the seismic source event and seismic sensors, wherein the processor is part of the towed seismic equipment.

15. The system of claim 11, wherein the processor is adapted to determine a signature of the seismic source event and further process the data based at least in part on the determined signature.

16. The system of claim 11, wherein the processor is adapted to compare the at least one image to at least one predetermined image pattern to detect seismic equipment failure.

17. An article comprising a non-transitory computer readable storage medium containing instructions that when executed by a processor-based system cause the processor-based system to:
    obtain data indicative of at least one photographic image of a seismic source event, the seismic source event comprising an air bubble; and
    process the data to determine an attribute associated with the seismic source event, including determining a volume of the air bubble.

18. The article of claim 17, the storage medium containing instructions that when activated cause the processor-based system to process the data to determine a motion of the seismic source event.

19. The article of claim 17, the storage medium containing instructions that when activated cause the processor-based system to process the data to determine a volume of the seismic source event.

20. The article of claim 17, the storage medium containing instructions that when activated cause the processor-based system to determine a signature of the seismic source in response to the data.

21. The article of claim 17, the storage medium containing instructions that when activated cause the processor-based system to compare the at least one image to at least one predetermined image pattern to detect a seismic equipment failure.

22. The method of claim 1, further comprising:
    processing the data to determine a signature of the seismic source event; and
    using the signature in the processing of the data to determine the attribute.

* * * * *